United States Patent
Luedtke

(10) Patent No.: US 8,275,638 B1
(45) Date of Patent: *Sep. 25, 2012

(54) APPARATUS AND METHOD FOR CREATING A RETIREMENT MEDICAL PROGRAM THROUGH A PROFIT SHARING PLAN AND A PENSION PLAN RETIREE HEALTH ACCOUNT

(76) Inventor: Timothy J Luedtke, Berwyn, PA (US)

(*) Notice: Subject to any disclaimer, the term of this patent is extended or adjusted under 35 U.S.C. 154(b) by 369 days.

This patent is subject to a terminal disclaimer.

(21) Appl. No.: 12/363,773

(22) Filed: Feb. 1, 2009

Related U.S. Application Data

(63) Continuation-in-part of application No. 10/359,348, filed on Feb. 5, 2003, now Pat. No. 7,739,131, and application No. 12/363,773.

(60) Provisional application No. 60/404,106, filed on Aug. 16, 2002, provisional application No. 61/025,707, filed on Feb. 1, 2008.

(51) Int. Cl.
*G06Q 40/00* (2012.01)
(52) U.S. Cl. ........................ 705/4; 705/2; 705/3; 705/35
(58) Field of Classification Search .............. 705/1, 2–4, 705/26, 35

See application file for complete search history.

(56) References Cited

U.S. PATENT DOCUMENTS 6,041,313 A * 3/2000 Gilbert et al. ............... 705/36 R
7,739,131 B1 6/2010 Luedtke

OTHER PUBLICATIONS

Coleman, Dennis. "Planning Opportunities for Tax Effective Funding of Post-retirement Medical Benefits With a Profit Sharing Plan." 21 Tax Management Compensation Planning Journal No. 11 (1993), pp. 276-281.*

Jay Jensen, Abba Rabbani Ede Olsen, Jim Holland (Reviewer); "Chapter 8 IRC Section 401(h) Retiree Medical Benefits"; Employee Plans CPE Technical Topics for 2001; 2001; pp. 147, 508-548; Internal Revenue Service; United States.

* cited by examiner

*Primary Examiner* — Michelle Le

(57) ABSTRACT

An apparatus and method of using the apparatuse. The method includes: controlling a computer system comprising a digital computer processor to process input data into output data, the processor in communication with an input device, to receive the input data, and to an output device, to output the output data, the processor programmed so as to facilitate managing a dual purpose profit sharing plan cooperating with a pension plan such that money in an incidental account of the dual purpose profit sharing plan funds a retiree health account of an employee of an employer, and money in another account of the dual purpose profit sharing plan funds pension plan retirement income benefits of the employee.

27 Claims, 10 Drawing Sheets

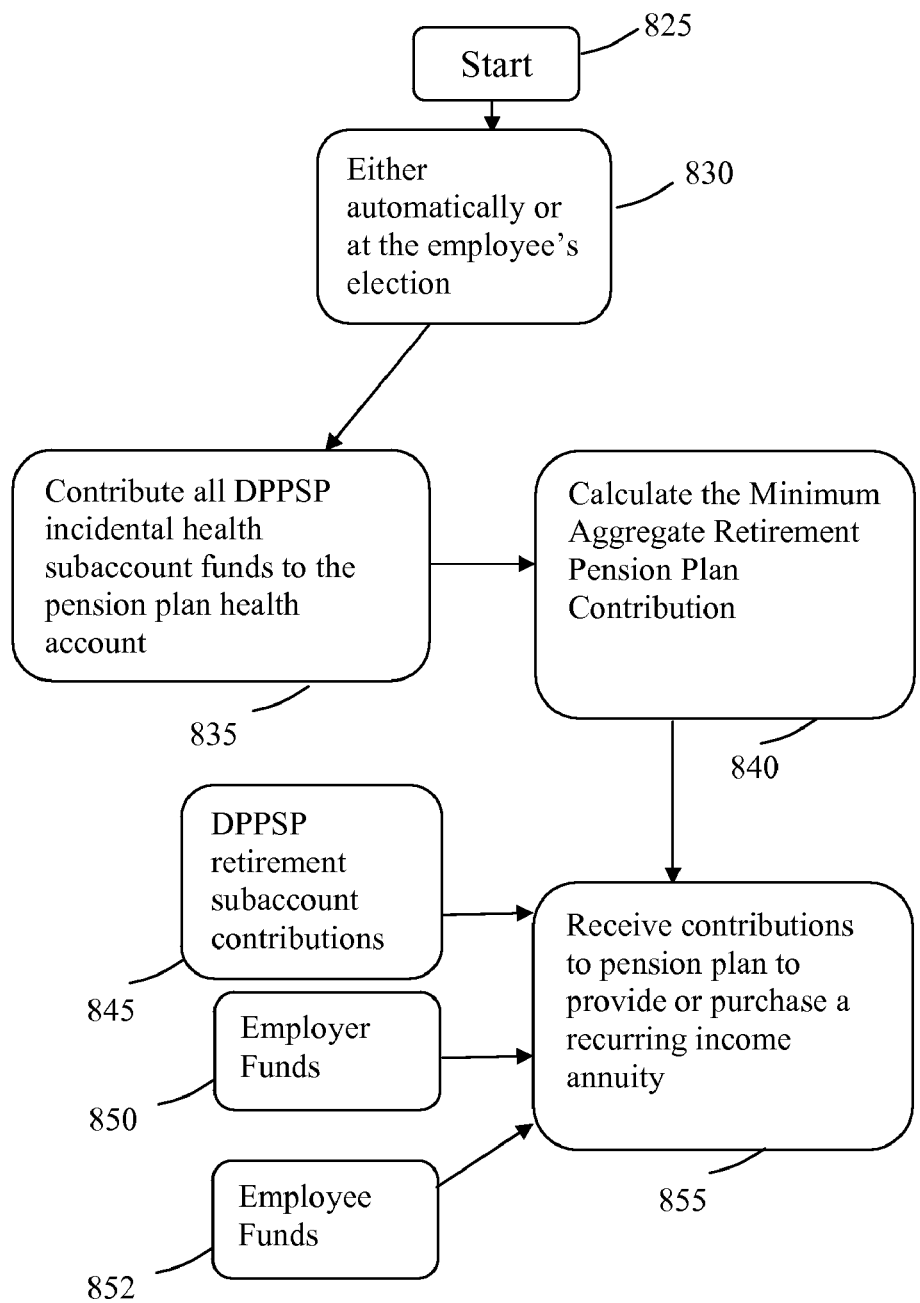

APPARATUS AND METHOD FOR CREATING A RETIREMENT MEDICAL PROGRAM THROUGH A PROFIT SHARING PLAN AND A PENSION PLAN RETIREE HEALTH ACCOUNT

CROSS-REFERENCE TO RELATED APPLICATION

This application is a continuation in part of Ser. No. 10/359,348 filed Feb. 5, 2003, now U.S. Pat. No. 7,739,131 and further claims the benefit of U.S. Provisional Patent Application Ser. No. 61/025,707 filed Feb. 1, 2008. The disclosures of the foregoing applications are hereby incorporated herein by reference.

COPYRIGHT NOTICE

This document contains material that is subject to copyright protection. The copyright owner has no objection to a statutory fair use of this material, as it appears in the files or records of the U.S. Patent and Trademark Office, but otherwise reserves all copyright rights whatsoever.

FIELD OF THE INVENTION

The technical field is computers and data processing systems. Depending on the implementation, there is apparatus, method for using and method for making, and corresponding products produced thereby, as well as data structures, computer-readable media tangibly embodying program instructions, manufactures, and necessary intermediates of the foregoing, each pertaining to digital aspects of wide area network communications. Embodiments can have utility in such areas as employee retiree income and health benefit plans, defined benefit pension plans containing a retiree health account in tandem with a Dual-Purpose Profit Sharing benefit plan (DPPSP) to employees, and the like.

SUMMARY OF INVENTION

In the description herein, various aspects of embodiments have been described. For purposes of explanation, specific numbers, systems and configurations were set forth in order to provide a thorough understanding of the embodiments. However, it is apparent to one skilled in the art having the benefit of this disclosure that the embodiments may be practiced without the specific details. In other instances, well-known features were omitted or simplified in order not to obscure the embodiments.

For purposes of this document, the combined defined contribution and defined benefit plan that is an embodiment will be known as the AURA$^{SM}$ Plan (with the stand-alone defined contribution plan being known as a Navigator Plan™) and is a continued expansion of the plan outlined in the pending patent filing (U.S. patent application Ser. No. 10/359,348 filed Feb. 5, 2003). Possible applications of this invention and the AURA$^{SM}$ Plan would be for retiree health care, prescription drug needs, medical claims under workers' compensation, pre-funding active employees' health care needs, funding Part B, Part C, and Part D Medicare premiums, pre-funding injury and sickness benefits, and the like.

According to an embodiment, there can be a method of using an apparatus, the method including the steps of: controlling a computer system comprising a digital computer processor to process input data into output data, the processor in communication with an input device to receive the input data and to an output device to output the output data, said processor programmed so as to facilitate managing a dual purpose profit sharing plan cooperating with a pension plan wherein said managing includes: specifying a limit to money contributed to the dual purpose profit sharing plan to one of: a level amount that would be contributed over an employee's working life time to fund their retiree health pension plan benefits, a level percentage of the employee's salary, or a percentage of the employer cost to fund the employer's cost of funding the retiree medical benefits; receiving, as some of said input data: amounts of money to be contributed to the dual purpose profit sharing plan; and monitory the to be contributed amounts so as to determine whether to signal that the one of the limits is exceeded; and if the one of the limits is exceeded, issuing one or more signals, and if one of the limits is not exceeded, not issuing a signal.

According to an embodiment, there can be a method to managing further including the steps of: specifying a limit so that contributions made for pension plan retiree health benefits are less than a specified percentage of contributions made to provide pension plan retirement income benefits; receiving further, as some of said input data: a percentage factor that is the aggregate contribution limit across all employees for which contributions to provide retiree health benefits are to be related to the aggregate plan contributions for all benefits for all employees, the aggregate amount, for all employees, of money contributed to the dual purpose profit sharing plan; and monitory the pension plan retiree health benefits and contributions for pension plan retirement income benefits so as to determine whether to signal that the limit is exceeded; if the limit is exceeded, issuing one or more signals; and if the limit is not exceeded, not issuing one or more signals.

Another embodiment, is a method of using an apparatus, the method including the steps of: controlling a computer system comprising a digital computer processor to process input data into output data, the processor in communication with an input device to receive the input data and to an output device to output the output data, processor programmed to facilitate the manipulation of health data to compute actuarially equivalent contributions to a retirement health benefit plan and wherein said facilitating includes: receiving as some of said input data: health data; determining one or more health expectation factors; and using at least some of the one or more health expectation factors to compute one or more actuarially equivalent contributions to a retirement health benefit plan.

According to a further embodiment, there can be a computer-implemented system for managing a dual purpose profit sharing plan cooperating with a pension plan wherein said system comprises: a computer-to-computer communication apparatus to send information to and receive information from a computer system used to manage a dual purpose profit sharing plan cooperating with a pension plan; a processor attached to the communication apparatus, the processor including: means for receiving contributions amounts of money to be contributed to the dual purpose profit sharing plan; means for specifying a limit to money contributed to the dual purpose profit sharing plan to one of: a level amount that would be contributed over an employee's working life time to fund their retiree health pension plan benefits, a level percentage of the employee's salary, or a percentage of the employer cost to fund the employer's cost of funding the retiree medical benefits; means for calculating the limit; means for comparing the contribution amounts of money to be contributed to the dual purpose profit sharing plan against the specified limit; means for transmitting a one or more signals if the to be contributed amount exceeds the specified limit; and means for transmitting an one or more signals if the to be contributed amount does not exceed the specified limit.

According to a further embodiment, the computer-aided system further comprises: means for specifying a limit so that aggregate contributions made for all employees for pension plan retiree health benefits are less than a specified percentage of contributions made for all employees to provide pension plan retirement income benefits; means for calculating the limit; means for comparing the aggregate contribution amounts for all employees against the specified limit; means for transmitting a one or more signals if the to be contributed amounts does not exceed the specified limit; means for calculating acceptable contribution amounts for each employee such that the specified limit is met for all employees when the acceptable contributions are contributed; and means for transmitting one or more signals if the to be aggregate contributed amounts exceed the specified limit.

BRIEF DESCRIPTION OF THE DRAWINGS

The discussed embodiment of the present invention is best understood from the following detailed description when read in connection with the accompanying drawings. It is emphasized that, according to common practice, the various features of the drawing are not to scale. On the contrary, the dimensions of the various features are arbitrarily expanded or reduced for clarity.

FIG. 8B is an illustration of an exemplary embodiment.

DETAILED DESCRIPTION

Figure 1:
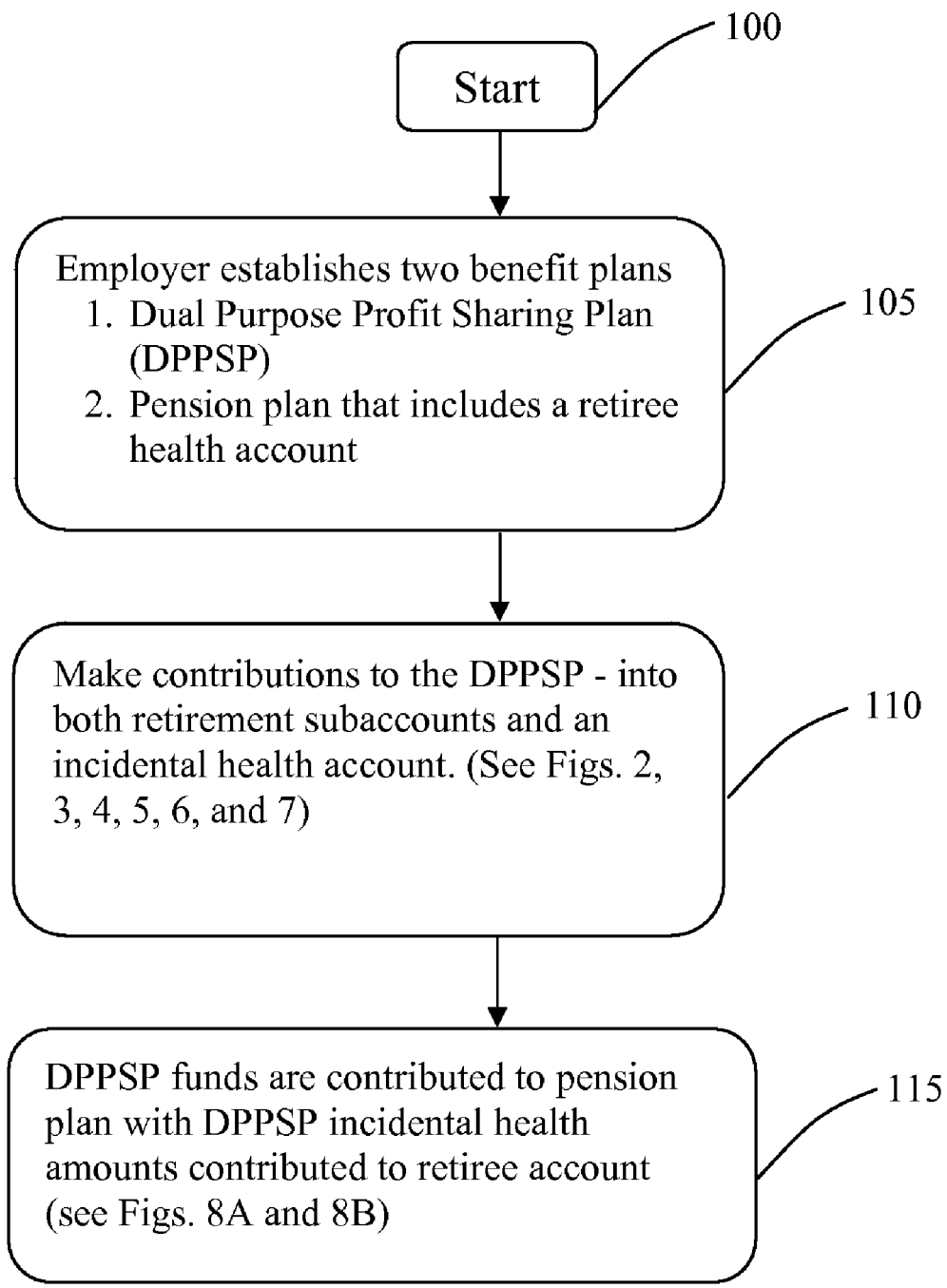
FIG. 1 is an illustration of an exemplary embodiment of the present invention.

The exemplary embodiment descriptions outlined herein may be converted to program code by those knowledgeable in the art and executed on a computer or a network of computers to administer an employer-sponsored benefits program providing retirement, health, and accident benefits. Health and accident benefits may include, but are not limited to, medical (including medical benefits payable under COBRA or workers' compensation), dental, vision, pharmacy benefits, long-term care, mental health, and life insurance. The health benefits include any item defined as deductible under tax law rules and may be provided either directly or indirectly (through insurance) by an employer as part of a tax qualified reimbursement plan. For purposes of an embodiment of the present invention, health and accident benefits will also be called incidental or ancillary benefits as applicable—consistent with Internal Revenue Service usage. Retirement benefits may be provided through a tax qualified employer-sponsored profit sharing plan. The combined plan will preferably be established as a Dual Purpose Profit Sharing Plan (DPPSP). Note: When the term "reimbursement plan" is used within this specification it includes any direct or indirect plan of reimbursement—direct includes self-insured employer-provided or union-provided plans and indirect includes insurance purchased from a third-party (including either a private or a public entity). While such U.S. Tax rules may change in the future, such changes would not diminish the importance of the claims in the suggested embodiment of this invention, nor alter the method and system covered by such claims.

In addition to the DPPSP, a pension plan will be provided by the employer (or union)—such pension plan to include provisions to offer tax qualified retiree health benefits in addition to retirement benefits.

Using this embodiment to calculate contributions to a DPPSP in order to insure subsequent contributions to the pension plan for income and health benefits are appropriate creates a retirement income and health care program. Such retirement income and health care program is considered an exemplary method.

Embodiments may be implemented in hardware or software, or a combination of both. However, embodiments may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system embodying the playback device components includes any system that has a processor or processors, or the like, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

As used herein, the term "computer" generally refers to hardware or hardware in combination with one or more program(s), such as can be implemented in software. Computer aspects can be implemented on general purpose computers or specialized devices, and can operate electrically, optically, or in any other fashion. A computer as used herein can be viewed as at least one computer having all functionality or as multiple computers with functionality separated to collectively cooperate to bring about the functionality, and in some embodiments (depending on context herein) computer systems can overlap. As used herein, the term "computer" generally refers to hardware or hardware in combination with one or more program(s), such as can be implemented in software. Computer aspects can be implemented on general purpose computers or specialized devices, and can operate electrically, optically, or in any other fashion. A computer as used herein can be viewed as at least one computer having all functionality or as multiple computers with functionality separated to collectively cooperate to bring about the functionality, and in some embodiments (depending on context herein) computer systems can overlap. Logic flow can represent signal processing, such as digital data processing, communication, or as evident from the context hereinafter. Logic flow can be implemented in discrete circuits, programmed computer, or the equivalent. Computer-readable media, as used herein can comprise at least one of a RAM, a ROM, A disk, an ASIC, and a PROM.

Referring to FIG. 1, a flowchart illustrating an exemplary embodiment of the present invention. As shown in FIG. 1, at Step 100, the employer starts the process and establishes two benefit plans, at Step 105, to create the AURA$^{SM}$ Plan:
1. a Dual-Purpose Profit Sharing Plan (DPPSP) having at least one health (and/or life) and accident account; and
2. a defined benefit pension plan having a retiree health account At Step 110, at the end of each time period (a pay period, for example, but may be monthly, semi-annually, annually, or other appropriate period), the contributions are made and processed (contributions for health benefits are illustrated in detail in FIGS. 2, 3, 4, 5, 6, and 7) using a computerized system to assure that contributions to the DPPSP Health (and/or life) sub-account meet requirements and meet the limits of a pension plan (Health (and/or life) sub-accounts are considered non-retirement sub-accounts in the Flowcharts). At Step 115, at the time the employee vests in their income and health funds or terminates employment (voluntarily, involuntarily, or retires) DPPSP funds will transfer either automatically or through an employee's election to the pension plan to provide retiree income and health benefits (subject to DPPSP and pension plan document provisions, illustrated in detail in FIGS. 8A and 8B). Transfers to provide retiree income benefits will be only from the retirement sub-accounts of the DPPSP and transfers to the pension plan retiree health account will be from a DPPSP incidental health (and/or life) benefit subaccount.

Figure 2:
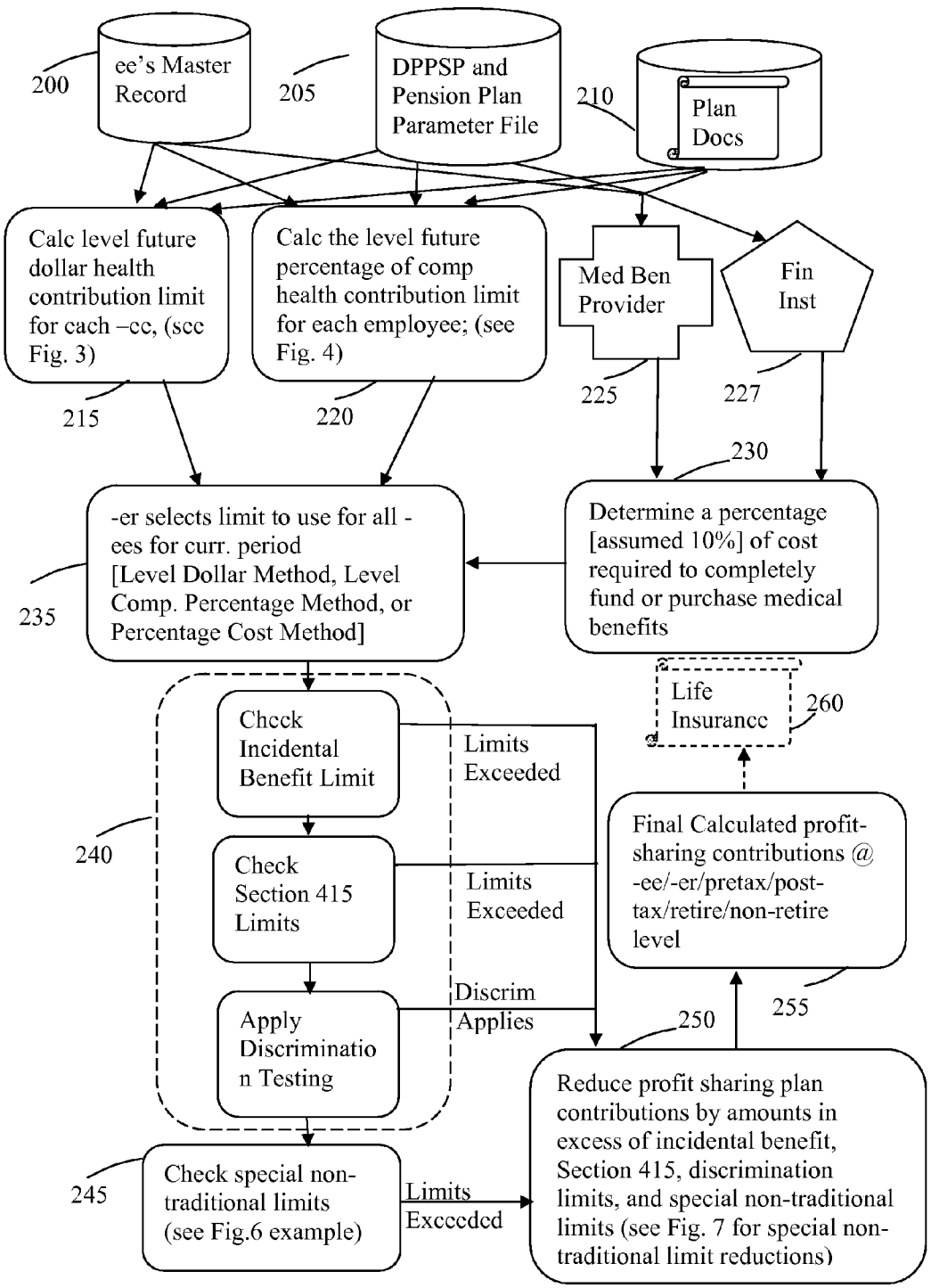
FIG. 2 is an illustration of an exemplary embodiment.

FIG. 2, a flowchart illustrating how the rules of an exemplary method and system of the present invention are applied is implemented by using a computer that is implemented with program code to perform the calculations at Steps 215, 220, 230, 245, and 250 and retrieves data from databases shown as Steps 200 and 205 and one holding detailed plan provisions at Step 210. Step 200 (employee's master record), Step 205 (profit sharing and pension plan parameter database), and Step 210 (profit sharing and pension plan document provisions), provide information that are available to be used in Step 215, Step 220, and Step 230 (at Step 230, the information is provided to Medical Benefit Providers at Step 225 and/or Financial Institutions at Step 227). The employee's master record may include, but is not limited to, demographic, personal, employment, payroll, employee-specific plan data. At Step 215, the level future dollar health contribution limit for each employee is actuarially determined by following the method and system outlined in FIG. 3.

Figure 3:
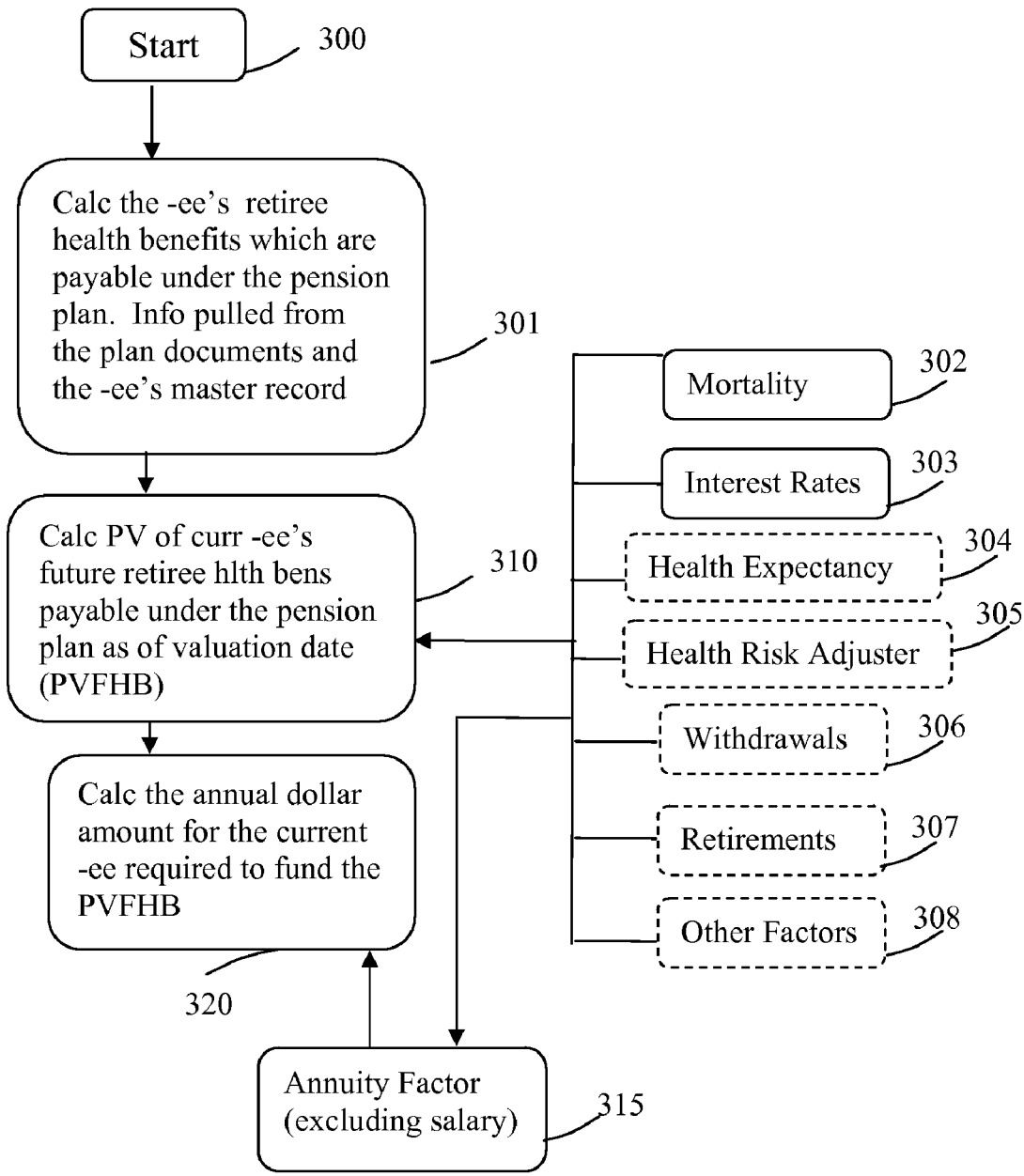
FIG. 3 is an illustration of an exemplary embodiment.

Referring to FIG. 3, a flowchart illustrating an exemplary embodiment for calculating the level annual dollar amount to fund the retiree health benefits under the pension plan for the current employee (Level Dollar Method). The FIG. 3 process is implemented on a computer using computer code to calculate the level annual dollar amount for the current employee and for all employees covered by the dual purpose profit sharing plan and eligible to participate in the pension plan. After starting at Step 300, at Step 301, calculate the current employee's retiree health benefits which are payable under the pension plan either automatically or would be payable under the pension plan should the employee elect to contribute to the pension plan on their election date.

Figure 9:
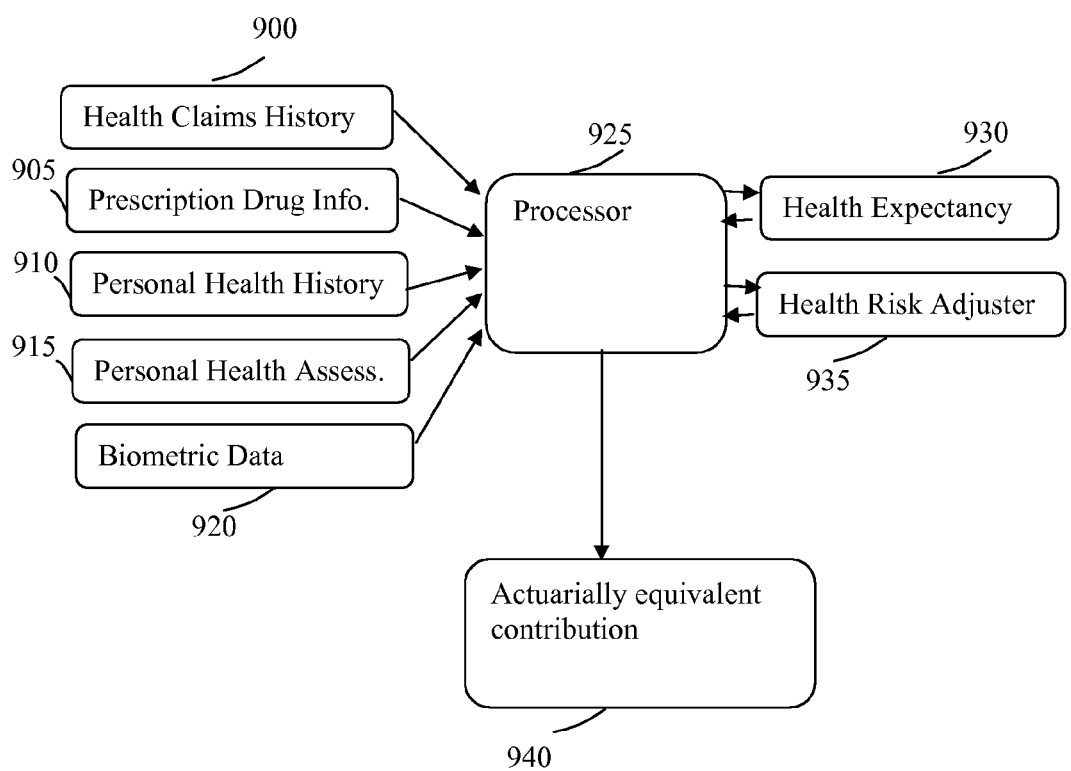
FIG. 9 is an illustration of an exemplary embodiment.

At Step 310, calculate the present value of the current employee's future retiree health benefits (PVFHB) payable under the pension plan as of the valuation date (determined in Step 301). The present value calculation can include the discounted effects of expected mortality (Step 302) and interest (Step 303), using methodologies commonly used by and familiar to actuaries or those trained in the art. Such present value calculation may also include the discounted effects of health expectancy (Step 304), health risk adjuster (Step 305), withdrawals (Step 306), retirements at various ages (Step 307), and other pertinent factors (Step 308) as determined by the user, also using methodologies commonly used by and familiar to actuaries or those trained in the art. Step 304 and Step 305, where used, are important additions offered by this invention to the calculation of DPPSP incidental health (and/or life) subaccount contributions; not used today for profit sharing contributions, actuaries have been increasingly learning and developing the concepts of measuring a person's health expectancy (the period of a person's lifetime that is expected to be spent in relatively good health) and health risk adjusters which are used by the Centers for Medicare and Medicaid Services to adjust Medicare/Medicaid premiums payable to payors to provide actuarially equivalent rates to account for differences in a particular payor's population health risk profile. Health risk adjusters and associated predictive models are currently offered by D2Hawkeye, DxCG, Ingenix, among others. Refer to FIG. 9, for an embodiment of actuarial equivalence.

At Step 315, calculate an annuity factor (XCAF). The annuity factor is calculated such that a value of $1 is payable annually for each year between the valuation date and the projected retirement date or dates. For any partial years, between the valuation date and the retirement date or dates, the amount will be a prorated portion of $1 equal to the period of time for such partial year. The annuity factor can include the discounted effects of expected mortality (Step 302) and interest (Step 303) and exclude the effect of compensation, using methodologies commonly used by and familiar to actuaries or those trained in the art. Such annuity factor may also include the discounted effects of health expectancy (Step 304), health risk adjuster (Step 305), withdrawals (Step 306), retirements at various ages (Step 307), and other pertinent factors (Step 308) as determined by the user, also using methodologies commonly used by and familiar to actuaries or those trained in the art. At Step 320, the PVFHB is divided by the XCAF to calculate the level annual dollar amount to be contributed either by or on behalf of the current employee for the current period to the DPPSP health (and/or life) subaccount.

Figure 4:
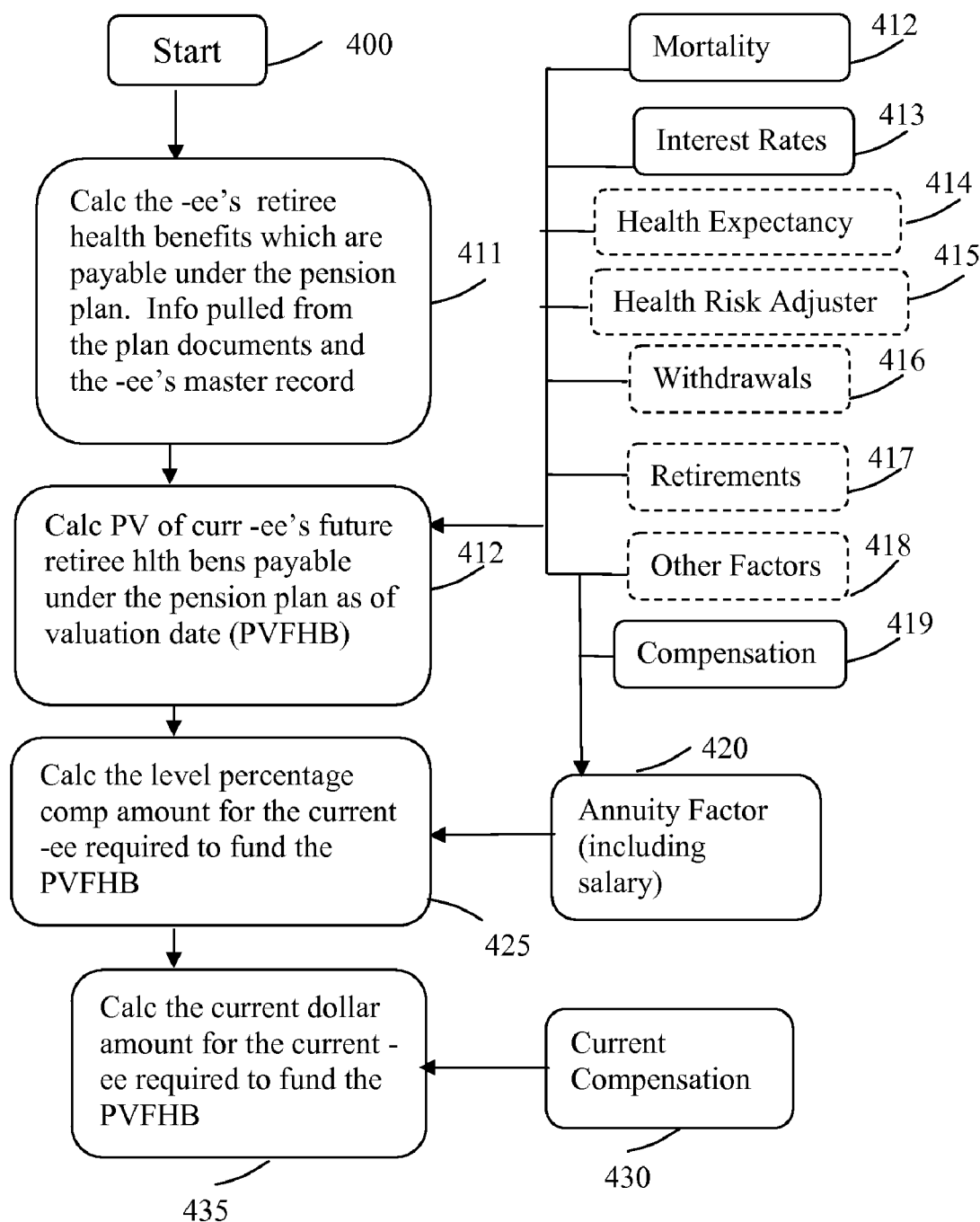
FIG. 4 is an illustration of an exemplary embodiment.

At Step 220, the level future percentage of compensation dollar health contribution limit for each employee is actuarially determined by following the method and system outlined in FIG. 4.

Referring to FIG. 4, a flowchart illustrating an exemplary embodiment for calculating the current dollar amount to fund the retiree health benefits under the pension plan as a level percentage of compensation for the current employee (Level Compensation Percentage Method). The FIG. 4 process is implemented on a computer using computer code to calculate the current dollar amount as a level percentage of compensation for the current employee and for all employees covered by the dual purpose profit sharing plan and eligible to participate in the pension plan. After starting at Step 400, at Step 410, calculate the current employee's retiree health benefits which are payable under the pension plan either automatically or would be payable under the pension plan should the employee elect to contribute to the pension plan on their election date.

At Step 411, calculate the present value of the current employee's future retiree health benefits (PVFHB) payable under the pension plan as of the valuation date (determined in Step 410). The present value calculation can include the discounted effects of expected mortality (Step 412) and interest (Step 413), using methodologies commonly used by and familiar to actuaries or those trained in the art. Such present value calculation may also include the discounted effects of health expectancy (Step 414), health risk adjuster (Step 415), withdrawals (Step 416), retirements at various ages (Step 417), and other pertinent factors (Step 418) as determined by the user, also using methodologies commonly used by and familiar to actuaries or those trained in the art. Step 414 and Step 415, where used, are important additions offered by this invention to the calculation of DPPSP incidental health (and/or life) subaccount contributions; not used today for profit sharing contributions, actuaries have been increasingly learning and developing the concepts of measuring a person's health expectancy (the period of a person's lifetime that is expected to be spent in relatively good health) and health risk adjusters which are used by the Centers for Medicare and Medicaid Services to adjust Medicare/Medicaid premiums payable to payors to provide actuarially equivalent rates to account for differences in a particular payor's population health risk profile. Health risk adjusters and associated predictive models are currently offered by D2Hawkeye, DxCG, Ingenix, among others. Refer to FIG. 9, for an embodiment of actuarial equivalence.

At Step 420, calculate an annuity factor (NCAF). The annuity factor is calculated such that a value of $1 is payable annually for the current year and with the $1 adjusted each year between the valuation date and the projected retirement date or dates to account for changes in assumed compensation (Step 419). For any partial years, between the valuation date and the retirement date or dates, the amount will be a prorated portion of compensation adjusted $1, such proration equal to the period of time for such partial year. In addition to the effect of compensation, the annuity factor can include the discounted effects of expected mortality (Step 412) and interest (Step 413), using methodologies commonly used by and familiar to actuaries or those trained in the art. Such annuity factor may also include the discounted effects of health expectancy (Step 414), health risk adjuster (Step 415), withdrawals (Step 416), retirements at various ages (Step 417), and other pertinent factors (Step 418) as determined by the user, also using methodologies commonly used by and familiar to actuaries or those trained in the art. At Step 425, the PVFHB is divided by the NCAF to calculate the level percentage of compensation which is then applied to the employee's current compensation (Step 430) at Step 435 to calculate the level percentage of compensation dollar amount to be contributed either by or on behalf of the current employee for the current period to the DPPSP health (and/or life) subaccount.

Figure 5:
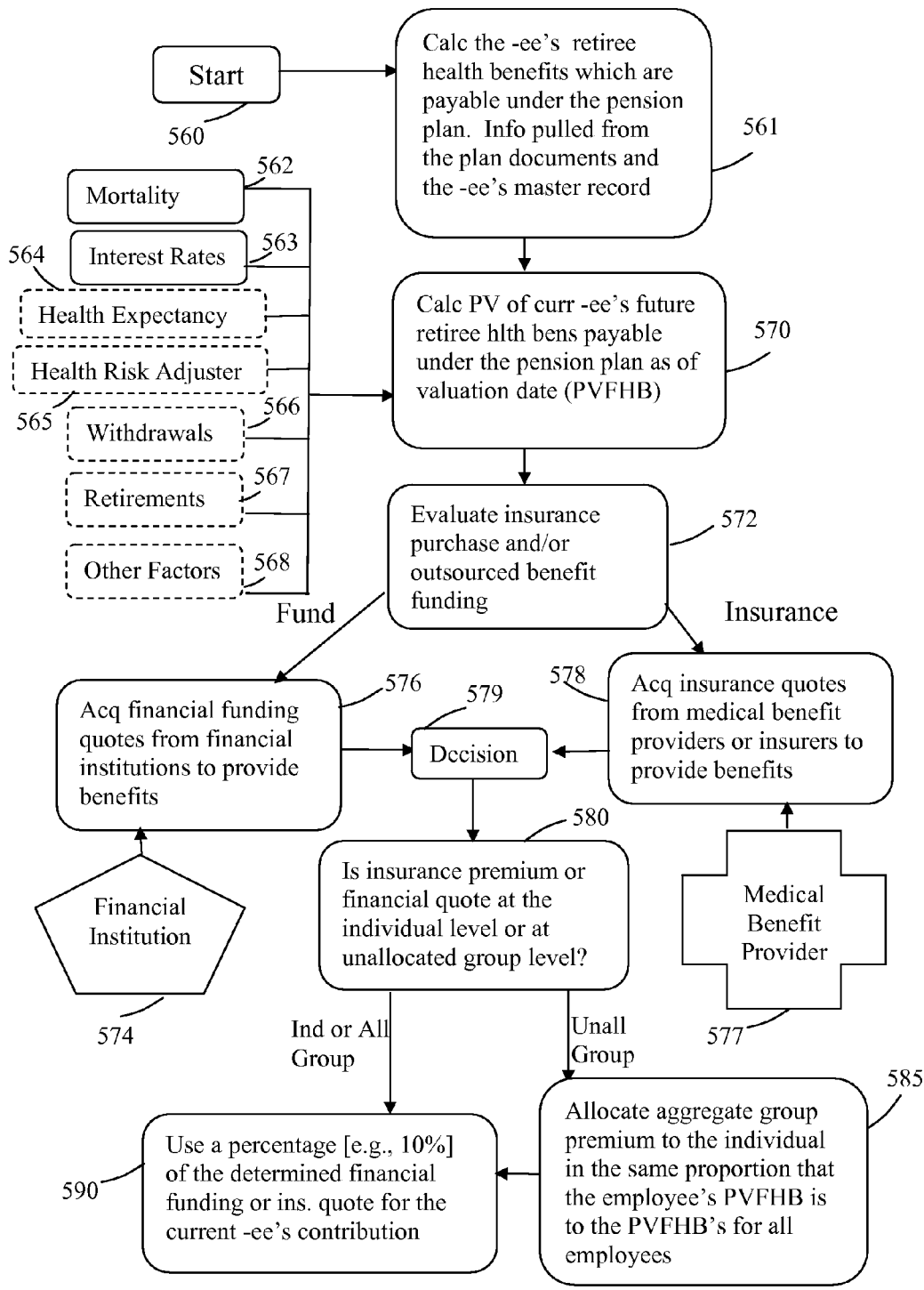
FIG. 5 is an illustration of an exemplary embodiment.

At Step 230, a predetermined percentage [e.g., 10%] of the cost to completely fund or purchase medical benefits for the employees retiree health benefits is determined by following the method and system outlined in FIG. 5.

Referring to FIG. 5, a flowchart illustrating an exemplary embodiment for calculating a percentage [e.g., 10%] of the cost to completely fund or purchase medical benefits for all employees and allocating such cost to fund the retiree benefits under the pension plan for the current employee (Percentage Cost Method). The FIG. 5 process at Step 561, Step 570, Step 585, and Step 590 is implemented on a computer using computer code to calculate the current contribution to be made by or on behalf of the employee and, in turn, for all employees covered by the dual purpose profit sharing plan and eligible to participate in the pension plan. After starting at Step 560, at Step 561, calculate the current employee's retiree health benefits which are payable under the pension plan either automatically or would be payable under the pension plan should the employee elect to contribute to the pension plan on their election date.

At Step 570, calculate the present value of the current employee's future retiree health benefits (PVFHB) payable under the pension plan as of the valuation date (determined in Step 561). The present value calculation can include the discounted effects of expected mortality (Step 562) and interest (Step 563), using methodologies commonly used by and familiar to actuaries or those trained in the art. Such present value calculation may also include the discounted effects of health expectancy (Step 564), health risk adjuster (Step 565), withdrawals (Step 566), retirements at various ages (Step 567), and other pertinent factors (Step 568) as determined by the user, also using methodologies commonly used by and familiar to actuaries or those trained in the art. Step 564 and Step 565, where used, is an important addition offered by this invention to the calculation of DPPSP incidental health (and/or life) subaccount contributions; not used today for profit sharing contributions, actuaries have been increasingly learning and developing the concepts of measuring a person's health expectancy (the period of a person's lifetime that is expected to be spent in relatively good health) and health risk adjusters which are used by the Centers for Medicare and Medicaid Services to adjust Medicare/Medicaid premiums payable to payors to provide actuarially equivalent rates to account for differences in a particular payor's population health risk profile. Health risk adjusters and associated predictive models are currently offered by D2Hawkeye, DxCG, Ingenix, among others. Refer to FIG. 9, for an embodiment of actuarial equivalence.

At Step 572, the employer begins an evaluation process to select an approach to either insure or fund the pension plan's retiree health benefits. At Step 576, the employer acquires financial funding quotes from financial institutions (Step 574) to provide the retiree health benefits. At Step 578, the employer acquires insurance quotes from medical benefit providers or insurers (Step 577) to provide the retiree health benefits. At Step 579, the employer makes a decision as to whether to use the financial funding quote or insurance quote as an input into the calculation for the contribution to the DPPSP health (and/or life) subaccount.

At Step 580, the selected financial funding quote or insurance quote is reviewed to determine whether the financial funding quote or insurance quote was developed and offered by the financial institution or medical benefit provider at the individual or at the unallocated group level. Where the aggregate financial funding quote or insurance quote has been presented by the financial institution or medical benefit provider so that the proportion of the financial funding quote or insurance quote attributed to the current employee is readily identifiable, then proceed to Step 590. If the aggregate financial funding quote or insurance quote is not at the individual or allocated group level, then proceed to Step 585. At Step 585, the financial funding quote or insurance quote is allocated to the individual employee level by allocating the aggregate financial funding quote or insurance quote in the same proportion that the current employee's present value of future health benefits (Step 570) has to the aggregate present value of future health benefits for all employees. At Step 590, the current employee's portion of the aggregate financial funding quote or insurance quote (from Step 580 or Step 585) is multiplied by a percentage [e.g., 10%] to calculate the dollar amount to be contributed either by or on behalf of the current employee for the current period to the DPPSP health (and/or life) subaccount.

At Step 235, using employer income, tax, budget, planning, and aggregate information from Step 215, Step 220, and Step 230 the employer selects which limit to use for all employees (Level Dollar Method, Step 215; Level Compensation Percentage Method, Step 220; or Percentage Cost Method, Step 230). The calculated current period amount for each employee is drawn from Step 320, Step 435, or Step 590 using the selected method. Then at Step 240, the profit sharing limits and tests outlined in U.S. patent application Ser. No. 10/359,348 filed Feb. 5, 2003 (these tests are not claimed as part of this invention) are applied.

At Step 245, any special non-traditional limits are applied. As a special non-traditional limit example see FIG. 6 for a description of a method and system for calculating the pension subordination limitation test. The pension subordination limitation test shown in FIG. 6 is a useful feature of this invention.

Figure 6:
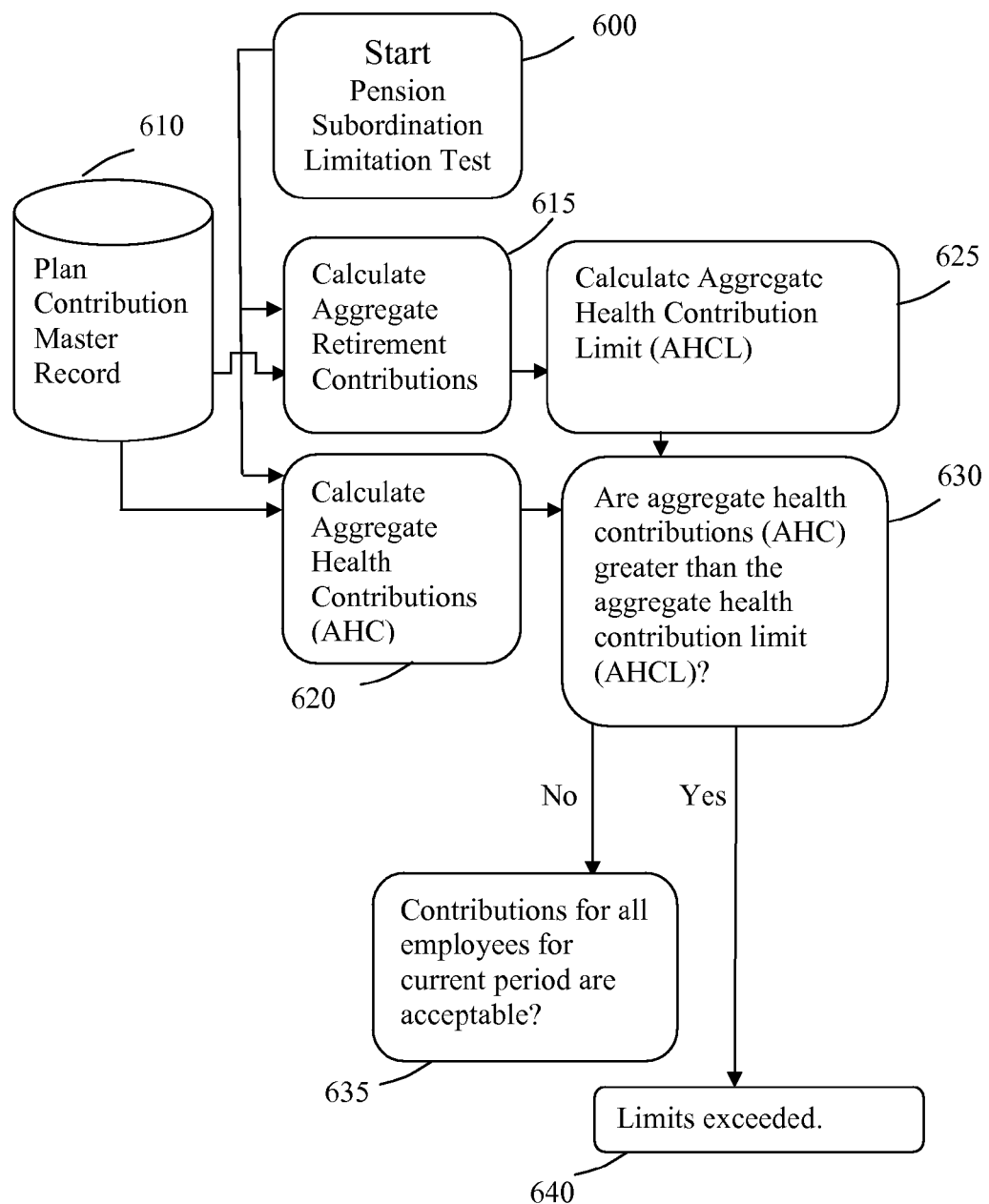
FIG. 6 is an illustration of an exemplary embodiment.

Referring to FIG. 6, a flowchart illustrating an exemplary embodiment for calculating a pension subordination test—an example of a special non-traditional limit process. The FIG. 6 process is implemented on a computer using computer code to calculate various factors to determine and limit the contribution made by or on behalf of the current employee for the current period to the DPPSP health (and/or life) subaccount. The computer code includes programming to calculate the result for Step 615, Step 620, Step 625, Step 630, and Step 640.

After starting at Step 600, proceed to Step 615. At Step 615, from previous plan financial information (Step 610) aggregate all retirement contributions made, including the current period contribution to be made, to the dual purpose profit sharing plan available to provide retirement income benefits regardless of source (include both employer and employee contributions, yet exclude any contributions made to an incidental health (and/or life) benefit subaccount or used to provide any life insurance protection). Such contributions to be valued as of the original contribution date and do not include any investment gains or losses that may have been generated since the contributions were first made to the profit sharing plan. For purposes of this patent, these contributions added for all employees are to be called Aggregate Retirement Contributions. The contributions are pulled from a master database (Step 610) which includes plan contributions made for employees. When adding the contributions, contributions may be selected either from all retirement income contributions made since the initial establishment of the profit sharing plan, from all retirement income contributions made since the initial establishment of the profit sharing plan as a dual purpose plan, or from all retirement income contributions made since the "date of establishment" of adding retiree health benefits to the pension plan. The "date of establishment" defined as the later of the adoption date of the plan amendment adding the retiree health account or the effective date of the plan amendment. For purposes of this exemplary embodiment of the present invention, contributions include all contributions made since the initial establishment of the profit sharing plan.

At Step 620, from previous plan financial information (Step 610) aggregate all health contributions made, including the current period contribution to be made, to the DPPSP to pay for incidental health (and/or life) benefits regardless of source (include both employer and employee contributions, also include any contributions used to provide any life insurance protection). Such contributions to be valued as of the original contribution date and do not include any investment gains or losses that may have been generated since the contributions were first made to the profit sharing plan. For purposes of this patent, these contributions are to be called Aggregate Health Contributions. The contributions are pulled from a master database (Step 610) which includes plan contributions made for employees. When adding the health contributions, contributions may be selected either from all health contributions (including those used to provide any life insurance protection) made since the initial establishment of the profit sharing plan, from all health contributions (including those used to provide any life insurance protection) made since the initial establishment of the profit sharing plan as a dual purpose plan, or from all health contributions (including those used to provide any life insurance protection) made since the "date of establishment" of adding retiree health benefits to the pension plan. The "date of establishment" defined as the later of the adoption date of the plan amendment adding the retiree health account or the effective date of the plan amendment. For purposes of this exemplary embodiment of the present invention, health contributions include all contributions made to the incidental health (and/or life) subaccount and all contributions used to provide any life insurance protection for all employees since the initial establishment of the profit sharing plan.

At Step 625, calculate the Aggregate Health Contribution Limit. Such limit is calculated by multiplying the Aggregate Retirement Contributions (the result of Step 615) across all employees by the tax qualified subordination rate [e.g., 25%] divided by the quantity of one minus the subordination rate [e.g., 25% or 0.25]. Under current tax regulations the subordination factor is [e.g., $\frac{1}{3}$]. The result is the Aggregate Health Contribution Limit.

At Step 630, the sum of Aggregate Health Contributions across all employees are checked against the Aggregate Health Contribution Limit. If the sum of Aggregate Health Contributions across all employees are less than the Aggregate Health Contribution Limit (Step 635), then the current period health contributions are acceptable. If the Aggregate Health Contributions are more than the Aggregate Health Contribution Limit (Step 640), then the limits are exceeded and leads to Step 250 from Step 245.

Figure 7:
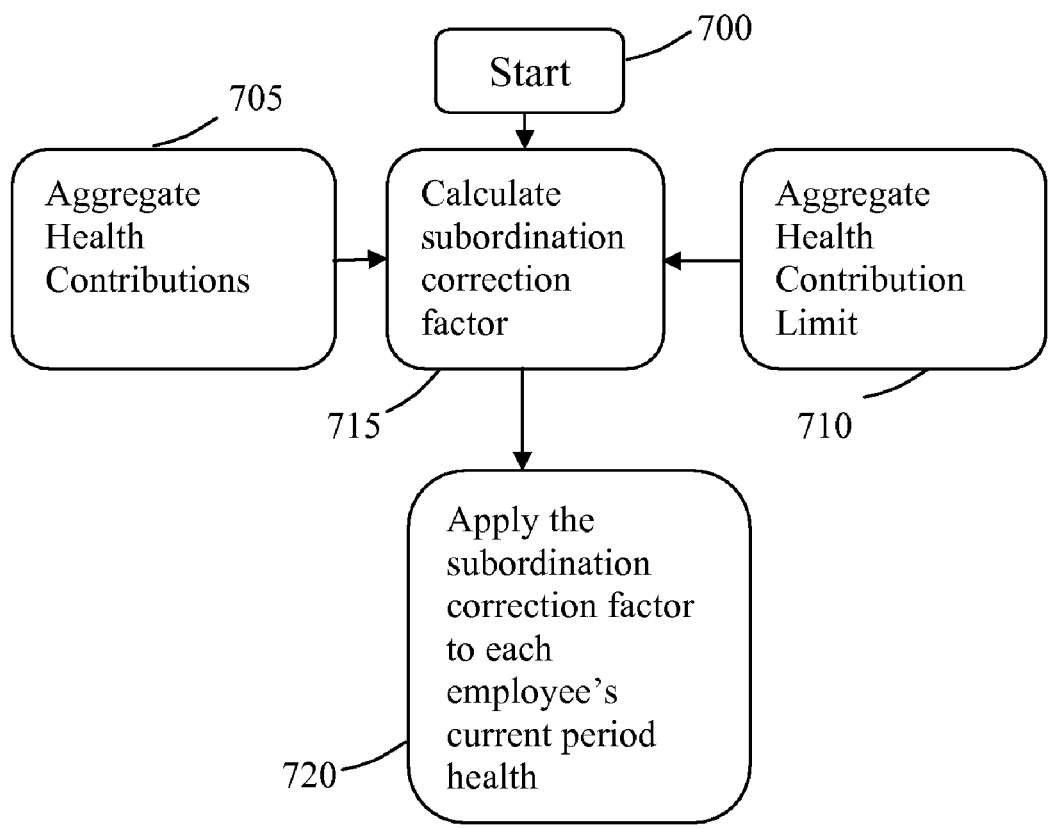
FIG. 7 is an illustration of an exemplary embodiment.

At Step 250, the current period health contributions are reduced using the method and system shown in FIG. 7, which are finalized and used to contribute to the DPPSP incidental health (and/or life) subaccount at Step 255. At Step 260, the contributions to the DPPSP incidental health (and/or life) subaccount may be placed into a life insurance contract, such contribution to a life insurance contract where the life insurance contract is valued at other than the cash value using life settlement techniques familiar to actuaries or those trained in the art and where the life insurance has one or more of the cash value and the death benefit (net of cash value) owned either directly or indirectly by one or more parties as a split dollar contract are considered exemplary aspects of this invention.

Referring to FIG. 7, a flowchart illustrating an exemplary embodiment for adjusting each employee's current period health contribution to meet the special non-traditional limit shown in FIG. 6. The FIG. 7 process is implemented on a computer using computer code to calculate various factors to adjust the health contribution made by or on behalf of the current employee for the current period to the DPPSP health (and/or life) subaccount, so that the health contribution meets the pension subordination limitation test. The computer code includes programming to calculate the result for Step 715 and Step 720, using information from Step 705 (calculated in Step 620) and Step 710 (calculated in Step 725).

After starting at Step 700, using inputs from Step 705 and Step 710, at Step 715, the system calculates the subordination correction factor. The subordination correction factor is a fraction whose numerator equals the Aggregate Health Contribution Limit (AHCL) less the quantity of Aggregate Health Contributions (AHC) less the sum of all current period health contributions and all current period contributions used to provide any life insurance protection for all employees (CurHlth) and whose denominator equals the sum of all current period health contributions and all current period contributions used to provide any life insurance protection for all employees (CurHlth). Or as a formula:

$$\text{Subordination Correction Factor} = \frac{AHCL - (AHC - CurHlth)}{CurHlth}$$

At Step 720, multiply the current employee's unadjusted current period health contribution and any current period amounts used to provide any life insurance protection by the subordination correction factor and reduce the result by any current period amounts used to provide any life insurance protection. If the result is less than zero, then the current period health contribution amounts for other employees can be reduced further so that the current period health contribution for the current employee is equal to zero.

Figure 8A:
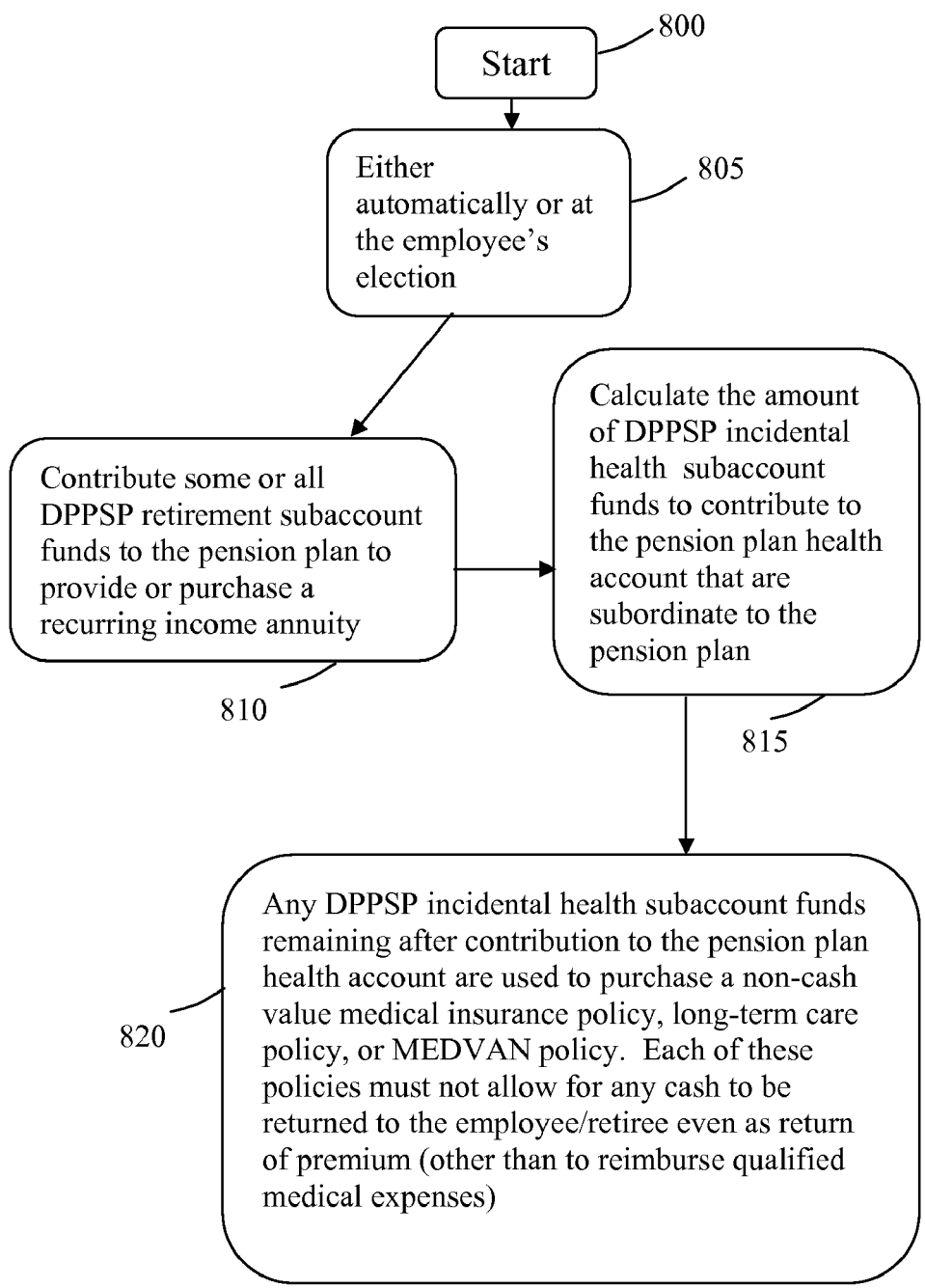
FIG. 8A is an illustration of an exemplary embodiment.

Referring to FIG. 8A, a flowchart illustrating an exemplary embodiment for making contributions from the DPPSP into the pension plan, so that the contributions to the retiree health account are certain to be subordinate to the retirement income contributions. The FIG. 8A process is implemented on a computer using computer code to calculate the contributions from the DPPSP into the pension plan, so that contributions to the health account are subordinate to the retirement income contributions. The computer code includes programming to calculate the result for Step 815.

Starting at Step 800, proceed to Step 805. At a plan document defined time when the employee vests in DPPSP subaccount contributions, terminates, or retires, the employee either automatically or is provided an option to elect to contribute to the pension plan. At Step 810, some portion or all of the funds in the DPPSP retirement subaccount(s) are used either automatically or through an election to purchase a retirement income annuity (such annuity may be provided directly by the employer's pension plan or as a favorable feature of this invention from an annuity provider (such as an insurance company). When purchasing the annuity as one exemplary embodiment of this invention the contributions used to purchase the annuity, when used to calculate the Aggregate Retirement Pension Plan Contributions, are to be valued as of the original contribution date to the DPPSP and do not include any investment gains or losses that may have been generated since the contributions were first made to the profit sharing plan. Note that like the process shown in FIG. 6, when adding the contributions, contributions may be selected either from all retirement income contributions made since the initial establishment of the profit sharing plan, from all retirement income contributions made since the initial establishment of the profit sharing plan as a dual purpose plan, or from all retirement income contributions made since the "date of establishment" of adding retiree health benefits to the pension plan. For purposes of this patent, these contributions when added for all employees are to be called Aggregate Retirement Pension Plan Contributions.

As another exemplary embodiment of this invention the Aggregate Retirement Pension Plan Contributions may be valued at the actual dollar value of the DPPSP retirement subaccount(s) when the funds are used to purchase the annuity (this dollar value includes any investment gains or losses that may have been generated since the contributions were first made to the DPPSP)—the DPPSP and/or pension plan documents will define how the Aggregate Retirement Pension Plan Contributions are to be calculated.

At Step 815, a portion or all of the funds in the DPPSP incidental health (and/or life) subaccount(s) are put into a retiree health account to provide retiree health benefits. As one exemplary embodiment of this invention the health contributions put into a retiree health account are to be valued as of the original contribution date to the DPPSP and do not include any investment gains or losses that may have been generated since the contributions were first made to the profit sharing plan. Note that like the process shown in FIG. 6, when adding the health contributions, contributions may be selected for a time period that is either from all health contributions (including those used to provide any life insurance protection) made since the initial establishment of the profit sharing plan, from all health contributions (including those used to provide any life insurance protection) made since the initial establishment of the profit sharing plan as a dual purpose plan, or from all health contributions (including those used to provide any life insurance protection) made since the "date of establishment" of adding retiree health benefits to the pension plan. The selected time period utilized should be the same as the selection utilized to calculate the Aggregate Retirement Pension Plan Contributions in Step 810. For purposes of this patent, these contributions added for all employees are to be called Aggregate Retirement Pension Plan Health Contributions.

As another exemplary embodiment of this invention the Aggregate Retirement Pension Plan Health Contributions may be valued at the actual dollar value of the DPPSP retirement subaccount(s) when the funds are put into the retiree health account (this dollar value includes any investment gains or losses that may have been generated since the contributions were first made to the DPPSP)—the DPPSP and/or pension plan documents will define how the Aggregate Retirement Pension Plan Health Contributions are to be calculated and the process should be consistent with that used for Aggregate Retirement Pension Plan Contributions.

At Step 820, at the earlier of the employee's employment termination or their retirement, any DPPSP incidental health (and/or life) subaccount funds remaining after the contribution has been made to the pension plan health account are used to purchase a non-cash value medical insurance policy, long-term care policy, or MEDVAN policy. Each of these policies can not allow for any cash to be returned to the employee/retiree even as return of premium (other than to reimburse qualified medical expenses).

As an alternative embodiment of this invention, See FIG. 8B, the funds that exist in the employee's incidental health (and/or life) subaccount (Step 835), when the employee vests in DPPSP subaccount contributions, terminates, or retires, are directly transferred into a pension plan retiree health account. Should this alternative embodiment be selected, then a Minimum Aggregate Retirement Pension Plan Contribution is calculated. Such Minimum Aggregate Retirement Pension Plan Contribution (Step 840) equals a multiple [e.g., 3, derived from the inverse of the subordination factor] of the sum of the health contributions made to the DPPSP incidental health (and/or life) account (Step 835), supplemented by any additional employer or employee funds (if desired), that are transferred into the pension plan retiree health account and the sum of any contributions utilized to provide incidental life benefits through the DPPSP. Using DPPSP retirement contributions (Step 845) supplemented with additional employer (Step 850) and/or employee (Step 852) contributions an amount equal to the Minimum Aggregate Retirement Pension Plan Contribution will then be placed in the pension plan to provide or purchase a retirement income annuity (Step 855).

Referring to FIG. 9, an additional embodiment, one or more of an employee's health claims history (Step 900), prescription drug information (Step 905), personal health history (Step 910), personal health assessment, and biometric data (Step 920), are used as input to a processor (Step 925) to determine one or more of the employee's health expectancy (Step 930) and a health risk adjuster (Step 935) as an interim step(s) to calculating the actuarially equivalent contribution to be made for the employee (Step 940).

Specified Embodiment

One possible specified embodiment of this invention would be a AURA$^{SM}$ Plan (also known as the Navigator Plan™) where an employer establishes two plans:
1) a Dual-Purpose Profit Sharing Plan (DPPSP) having at least one health (and/or life) and accident account; and
2) a defined benefit pension plan having a retiree health account Assets for the DPPSP and the defined benefit pension plan are held in the same trust. The employer provides the following benefits to the employee:
1) The employee may contribute up to 15% of pay to the DPPSP
2) The employer contributes a matching contribution equal to 50% of the employee's first 6% of pay to the DPPSP to which the employee immediately vests
3) The employer contribution is allocated 100% to the defined benefit pension plan providing the employee with a floor annual retirement income at the employee's normal retirement age
4) The employer also makes a 1% elective contribution to a DPPSP health (and/or life) subaccount specifically devoted to the payment defined medical expenses [currently defined by §213] incurred and reimbursed during the current year; such contribution to the DPPSP health (and/or life) subaccount is limited to an amount that is subordinate to the defined benefit pension plan contribution—the system described herein performs such calculation and assures that contributions ultimately made to the pension plan retiree health account will be subordinate to the aggregate pension contributions
5) Any amounts remaining in the DPPSP health (and/or life) subaccount at the end of the plan year or at employee termination (if sooner) are transferred to the pension plan's retiree health account In sum, appreciation is requested for the range of possibilities flowing from the core teaching herein. More broadly, however, the terms and expressions which have been employed herein are used as terms of teaching and not of limitation, and there is no intention, in the use of such terms and expressions, of excluding equivalents of the features shown and described, or portions thereof, it being recognized that various modifications are possible within the scope of the embodiments contemplated and suggested herein. Further, various embodiments are as described and suggested herein. Although the disclosure herein has been described with reference to specific embodiments, the disclosures are intended to be illustrative and are not intended to be limiting. Various modifications and applications may occur to those skilled in the art without departing from the true spirit and scope defined in the appended claims.

Thus, although only a few exemplary embodiments have been described in detail above, those skilled in the art will readily appreciate that many modifications are possible in the exemplary embodiments without materially departing from the novel teachings and advantages herein. Accordingly, all such modifications are intended to be included within the scope defined by claims. Means-plus-function claims are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment fastening wooden parts, a nail and a screw may be equivalent structures.

What is claimed:

1. A method of using an apparatus, the method including the steps of:
controlling a computer system comprising a digital computer processor to process input data into output data, the processor in communication with an input device, to receive the input data, and to an output device, to output the output data, said processor programmed so as to facilitate managing a dual purpose profit sharing plan cooperating with a pension plan such that money in an incidental account of the dual purpose profit sharing plan funds a retiree health account of an employee of an employer, and money in another account of the dual purpose profit sharing plan funds pension plan retirement income benefits of the employee, by operations including:
receiving, as some of the input data at the input device, a limit to money contributed to the incidental account of the dual purpose profit sharing plan, the limit corresponding to one of:
a level amount that would be contributed over a working life time of the employee to fund the retiree health account,
a level percentage of salary that would be contributed over a working life time of the employee to fund the retiree health account, or
a percentage of an aggregate cost of the employer allocated to fund the retiree health account;
receiving, as some of said input data at the input device, data representing money to be contributed to the dual purpose profit sharing plan;
determining from the input data an amount of contribution to the incidental account of the dual purpose profit sharing plan that the one of the limits is not exceeded; and
producing, as some of said output data at said output device, said amount of contribution.

2. The method of claim 1, wherein the one of the limits is the level amount that would be contributed over a working life time of the employee to fund the account.

3. The method of claim 1, wherein the one of the limits is the level percentage of salary that would be contributed over a working life time of the employee to fund the account.

4. The method of claim 1, wherein the one of the limits is the percentage of an aggregate cost of the employer allocated to fund the account.

5. The method of claim 1, further including the operations of:
receiving, as some of said input data at the input device, a second limit corresponding to an aggregate amount of incidental account contributions for all employees participating in the dual purpose profit sharing plan cooperating with said pension plan, the limit corresponding to:
a percentage of aggregate contribution made for said all employees;
receiving, as some of said input data at said input device:
a percentage factor,
an aggregate amount of contribution for said all employees;
determining an amount of contribution by which aggregate contribution to all incidental accounts for said all employees exceed the second limit, and performing one of
signaling to reduce the aggregate contributions to the incidental accounts,
signaling to increase the aggregate contributions to the at least one other accounts, or
signaling to perform a combination thereof, so as to produce some of said output data at said output device.

6. The method of claim 5, wherein the limit is a pension plan subordination limit.

7. The method according to claim 1, wherein some of the input data received at the input device includes an interest rate; and further including computing the one limit wherein said limit is.

8. The method according to claim 1, wherein some of the input data received at the input device includes a mortality rate; and further including computing the one limit wherein said limit is.

9. The method according to claim 1, wherein some of the input data received at the input device includes a health expectancy; and further including computing the one limit wherein said limit is.

10. The method according to claim 9, wherein computing the one limit determines an actuarial equivalent limit; and further including computing the one limit wherein said limit is.

11. The method according to claim 1, wherein some of the input data received at the input device includes a health risk adjuster; and further including computing the one limit wherein said limit is.

12. The method according to claim 11, wherein computing the one limit determines an actuarial equivalent limit; and further including computing the one limit wherein said limit is.

13. The method according to claim 1, wherein some of the input data received at the input device includes information of a health claim; and further including computing the one limit wherein said limit is.

14. The method according to claim 13, wherein computing the one limit determines an actuarial equivalent limit; and further including computing the one limit wherein said limit is.

15. The method according to claim 1, wherein some of the input data received at the input device includes data from a biometric reading; and further including computing the one limit wherein said limit is.

16. The method according to claim 15, wherein computing the one limit determines an actuarial equivalent limit; and further including computing the one limit wherein said limit is.

17. The method according to claim 1, wherein some of the input data received at the input device includes data from a health assessment; and further including computing the one limit wherein said limit is.

18. The method according to claim 17, wherein computing the one limit determines an actuarial equivalent limit; and further including computing the one limit wherein said limit is.

19. The method according to claim 1, wherein some of the input data received at the input device includes a funding quote to completely fund the retiree health account; and further including computing the one limit wherein said limit is.

20. The method according to claim 1, wherein some of the input data received at the input device includes an insurance quote to completely insure the retiree health account; and further including computing the one limit wherein said limit is.

21. The method according to claim 1, wherein the one or more signals includes the contribution amount to be used as a life insurance premium.

22. Apparatus to facilitate managing a dual purpose profit sharing plan cooperating with a pension plan, the apparatus including:
a computer system comprising a digital computer processor to process input data into output data, the processor in communication with an input device, to receive the input data, and to an output device, to output the output data, said processor programmed so as to facilitate managing a dual purpose profit sharing plan cooperating with a pension plan such that money in an incidental account of the dual purpose profit sharing plan funds a retiree health account of an employee of an employer, and money in another account of the dual purpose profit sharing plan funds pension plan retirement income benefits of the employee, by operations including:
receiving, as some of the input data at the input device, a limit to money contributed to the incidental account of the dual purpose profit sharing plan, the limit corresponding to one of:
a level amount that would be contributed over a working life time of the employee to fund the retiree health account,
a level percentage of salary that would be contributed over a working life time of the employee to fund the retiree health account, or
a percentage of an aggregate cost of the employer allocated to fund the retiree health account;
receiving, as some of said input data at the input device, data representing money to be contributed to the dual purpose profit sharing plan;
determining from the input data an amount of contribution to the incidental account of the dual purpose profit sharing plan that the one of the limits is not exceeded; and
producing, as some of said output data at said output device, said amount of contribution.

23. The apparatus according to claim 22, wherein some of the input data received at the input device includes a health expectancy; and further including computing the one limit wherein said limit is.

24. The apparatus according to claim 23, wherein computing the one limit determines an actuarial equivalent limit; and further including computing the one limit wherein said limit is.

25. The apparatus according to claim 22, wherein some of the input data received at the input device includes a health risk adjuster; and further including computing the one limit wherein said limit is.

26. The apparatus according to claim 25, wherein computing the one limit determines an actuarial equivalent limit; and further including computing the one limit wherein said limit is.

27. The apparatus of claim 22, further including:
a second computer system comprising a second digital computer processor to process second input data into second output data, the second processor in communication with a second input device, to receive the second input data, and to a second output device, to output the second output data, said second processor programmed so as to facilitate carrying out at least one of the dual purpose profit sharing plan and the pension plan.

\* \* \* \* \*